(12) United States Patent
Dubovsky et al.

(10) Patent No.: US 10,712,930 B2
(45) Date of Patent: Jul. 14, 2020

(54) 3D TOUCH BASED USER INTERFACE VALUE PICKERS

(71) Applicant: International Business Machines Corporation, Armonk, NY (US)

(72) Inventors: Oded Dubovsky, Haifa (IL); Yossi Mesika, Afula (IL)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/607,490

(22) Filed: May 28, 2017

(65) Prior Publication Data
US 2018/0341384 A1    Nov. 29, 2018

(51) Int. Cl.
G06F 3/048 (2013.01)
G06F 3/0488 (2013.01)
G06F 3/0485 (2013.01)
G06F 3/0484 (2013.01)

(52) U.S. Cl.
CPC .......... *G06F 3/0488* (2013.01); *G06F 3/0484* (2013.01); *G06F 3/0485* (2013.01); *G06F 3/04847* (2013.01); *G06F 2203/014* (2013.01); *G06F 2203/04808* (2013.01)

(58) Field of Classification Search
CPC ...... G06F 3/0488; G06F 3/048; G06F 3/0484; G06F 3/04847; G06F 3/0485; G06F 3/041; G06F 3/045; G06F 3/044
See application file for complete search history.

(56) References Cited

U.S. PATENT DOCUMENTS

| 9,030,419 | B1 | 5/2015 | Freed |
| 2006/0132457 | A1* | 6/2006 | Rimas-Ribikauskas ... G06F 3/04842 345/173 |
| 2007/0024595 | A1* | 2/2007 | Baker ................ G06F 3/03547 345/173 |
| 2008/0024459 | A1* | 1/2008 | Poupyrev ................ G06F 3/016 345/173 |
| 2008/0105470 | A1* | 5/2008 | Van De Ven ......... G06F 3/0414 178/18.01 |

(Continued)

FOREIGN PATENT DOCUMENTS

| CN | 105739761 | 7/2016 |
| CN | 106201308 | 12/2016 |
| EP | 20030729292 | 10/2004 |

OTHER PUBLICATIONS

Gladman, "ChromaTouch: a 3D Touch Colour Picker in Swift" FlexMonkey, Sep. 27, 2015. Can be found at: http://flexmonkey.blogspot.co.il/2015109/chromatouch-3d-touch-colour-picker-in.html.

(Continued)

*Primary Examiner* — Mahelet Shiberou
(74) *Attorney, Agent, or Firm* — Gregory Kirsch

(57) ABSTRACT

Electronic devices that include a force sensor input and input user interface elements are described. The force sensors may be located to detect force on the display of the electronic device. The force sensor, alone or in combination with one or more other sensors such as capacitive touch sensors, allows for interaction with the user interface input on the device. By using a hold detection logic with a pressure level sensitive sensor, user interface elements can be manipulated or values can be assigned to input elements.

18 Claims, 2 Drawing Sheets

(56) References Cited

U.S. PATENT DOCUMENTS

| | | | |
|---|---|---|---|
| 2011/0063248 A1* | 3/2011 | Yoon | G06F 3/0485 |
| | | | 345/174 |
| 2012/0249475 A1 | 10/2012 | Murphy et al. | |
| 2013/0141364 A1 | 6/2013 | Lynn et al. | |
| 2014/0247240 A1 | 9/2014 | Sinclair et al. | |
| 2015/0199063 A1 | 7/2015 | Algreatly | |
| 2015/0234446 A1 | 8/2015 | Nathan et al. | |
| 2015/0253918 A1 | 9/2015 | Algreatly | |
| 2016/0188181 A1* | 6/2016 | Smith | G06F 3/048 |
| | | | 715/765 |
| 2018/0113601 A1* | 4/2018 | Chirogene | G06F 3/04847 |

OTHER PUBLICATIONS

Sandhu, "An Evaluation of Two Dimensional and Three Dimensional User Interfaces for Colour Selection", A thesis submitted to the Faculty of Graduate and Post Doctoral Affairs in partial fulfillment of the requirements for the degree of Master of Computer Science in Human-Computer Interaction, Carleton University, Ottawa, Ontario, 2015.

Pediredla, "Understanding 3D Touch from a development perspective", hedgehog lab, Feb. 8, 2016. Can be found at: http://blog.hedgehoglab.com/understanding-3d-touch-from-a-development-perspective.

\* cited by examiner

3D TOUCH BASED USER INTERFACE VALUE PICKERS

FIELD OF TECHNOLOGY

The present invention relates to the technical field of user interfaces. In particular, the invention relates to 3D touch based user interfaces.

BACKGROUND OF THE INVENTION

A large and growing population of users employs various electronic devices to perform functions, such as placing telephone calls (voice and/or video), sending and receiving email, text messaging, accessing the internet, playing games, consuming digital content (e.g., music, movies, images, electronic books, etc.), and so on. Among these electronic devices are electronic book (eBook) reader devices, mobile telephones, desktop computers, portable media players, tablet computers, netbooks, and the like.

Many of these electronic devices include touch screens to allow users to interact with the electronic devices using touch inputs. While touch input is an effective way of interfacing with electronic devices in some instances, in many instances touch inputs are problematic. For example, it may be difficult to use touch inputs when using a device one handed. As another example, when interacting with a device using touch input, a user's finger or stylus typically obscures at least a portion of the screen.

Additionally, many existing electronic device interfaces are cumbersome and/or unintuitive to use. User interface controls used to perform various functions are often esoteric and unintuitive to users. For example, UI Pickers are elements of user interfaced used for picking from the end user a value with well-defined type and range. These pickers are often part of a mobile UI that requires an input from the user. One example of such a picker is a number picker which evolved from a simple text field with numerical validation into a virtual spinner. This virtual spinner requires interaction with the user to bring up the interface and further interaction to correctly select the desired value.

While picking or sliding the control has become much simpler than typing in the value in a mobile device there is still no use of the newly emerging technology of 3D/Force touch screens. Thus, there remains a need for new interfaces for electronic devices and techniques for interacting with such interfaces and electronic devices.

SUMMARY OF INVENTION

The present invention, in an embodiment, relates to an apparatus for interfacing with a computer device comprising a display comprising a force sensor, a force sensor controller configured to determine a force input based on a touch input to the display, and a processor coupled to the force sensor controller and configured to receive the force input, determine a user interface element associated with the location of the force input, determine a consistent hold has occurred, and modify the user interface element based on the force input. In an optional embodiment, modifying the user interface element based on the force input comprises applying a numerical quantity to an input field of the user interface element. In a preferred embodiment, the numerical quantity comprises a binned quantity. In an example embodiment, the user interface element comprises a picker. In a further example embodiment, the user interface element comprises a scroll input. In a preferred embodiment, wherein determining a consistent hold has occurred comprises converting the force input into a binned force quantity and determining that the binned force quantity has not changed over a period of time. In an optional embodiment, wherein the period of time is between 0.5 seconds and 2 seconds.

In an alternative embodiment, an electronic device comprises a display, at least one sensor to detect a user interaction event with the display, and a processing system to interpret data from the sensor and to display a user interface element on the display, wherein, the sensor receives a touch input from a user and generates a digitized force value and a display touch location, and wherein the processor receives the digitized force value and display touch location from the sensor, determines if the user interface element has been activated based on the display touch location, and if activated, determines if a consistent hold has occurred, and if a consistent hold has occurred, applies a data input to the user interface element. In a preferred embodiment, the data input to the user interface element comprises a numerical quantity. In a further preferred optional embodiment, the numerical quantity comprises a binned quantity. In an optional embodiment, the user interface element comprises a picker. In another optional embodiment, the user interface element comprises a scroll input. In an preferred embodiment, wherein determining if the consistent hold value has occurred comprises converting the digitized force value into a binned force quantity and determining that the binned force quantity has not changed over a period of time.

A method for modifying computer device user interfaces comprises receiving, from a display with an integrated force sensor, a touch input, determining, by a controller operatively coupled to the display, a display location and a force measurement based on the touch input, mapping, by a processor coupled to the controller, the display location to a user interface element, determining, by the processor, that a consistent hold has occurred, and applying the force measurement to the user interface element. In a preferred embodiment, applying the force measurement to the user interface element comprises inputting a quantitative value to an input field of the user interface element. In an optional embodiment, the user interface element comprises a picker. In another optional embodiment, the user interface element comprises a scroll input. In a further optional embodiment, applying the force measurement to the user interface element comprises scrolling the page based on the force measurement. In a preferred embodiment, determining a consistent hold value has occurred comprises converting the force measurement into a binned force quantity and determining that the binned force quantity has not changed over a period of time. In an optional embodiment, the period of time is between 0.5 seconds and 2 seconds.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

This disclosure describes, in part, new electronic devices, interfaces for electronic devices, and techniques for interacting with such interfaces and electronic devices.

For instance, this disclosure describes example electronic devices or computers that include a force sensor input and a processor or processing elements. In some embodiments, at least one of the force sensors may be located at or near the display of the electronic device. Using force sensor alone or in combination with one or more other sensors, such as capacitive touch sensors, in some embodiments, the electronic device allows for simple one-handed or hands-free interaction with the device. For instance, the device may include one or more inertial sensors (e.g., gyroscopes or accelerometers), or the like, information from which may be integrated with information from the force sensor for sensing gestures performed by a user or other combined interactions.

This disclosure is addressing a UI element being presented on a device which has the hardware of determining the level of pressure that one provides. This can be a tap on a mobile device screen, using digital pen or force touch trackpad installed on a laptop. In embodiments, it also requires an operating system that provides an API to capture such touch event and the level of pressure. The hardware to determine the level of pressure may contain a controller that generates a digitized force value or other related data. One such example is an iPhone 6s device with iOS operating system running on it. However, although widely supported in iOS devices this technology can also be found on other device from different vendors running operating systems such as Android.

Figure 1:
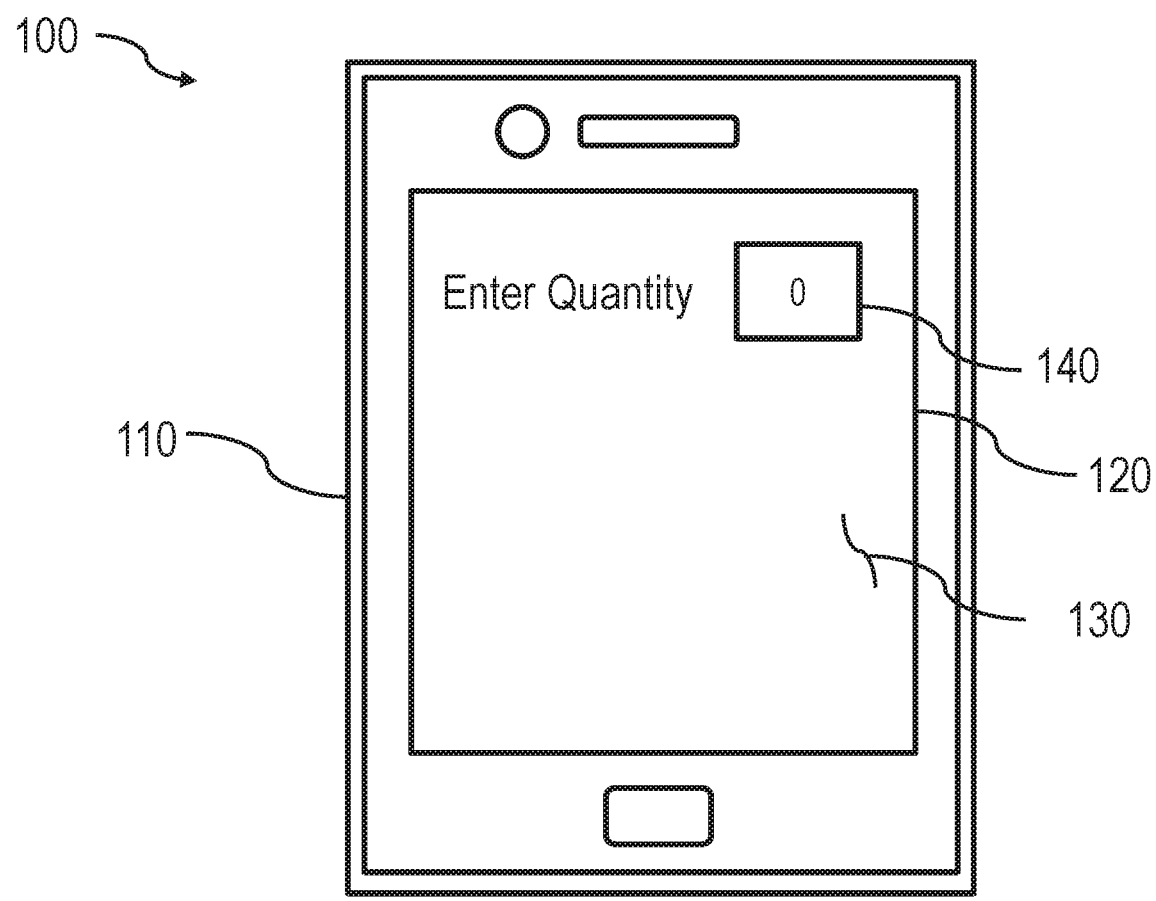
FIG. 1 illustrates a mobile device having a 3D touch UI, according to an embodiment of the present invention.

FIG. 1 illustrates a system 100 having a 3D touch UI, according to an embodiment of the present invention. The display 120 of the device 110 includes a force sensing element 130. The display 120 may also show an input user interface element 140. The input user interface element 140 takes a numerical input from the user. The input user interface element 140 may, in embodiments, be a UI picker.

By the term UI picker, user interface elements that their intention is to pick a value from the end user are referred to. The following description demonstrates implementing the essence of using a number picker, in an embodiment.

Figure 2:
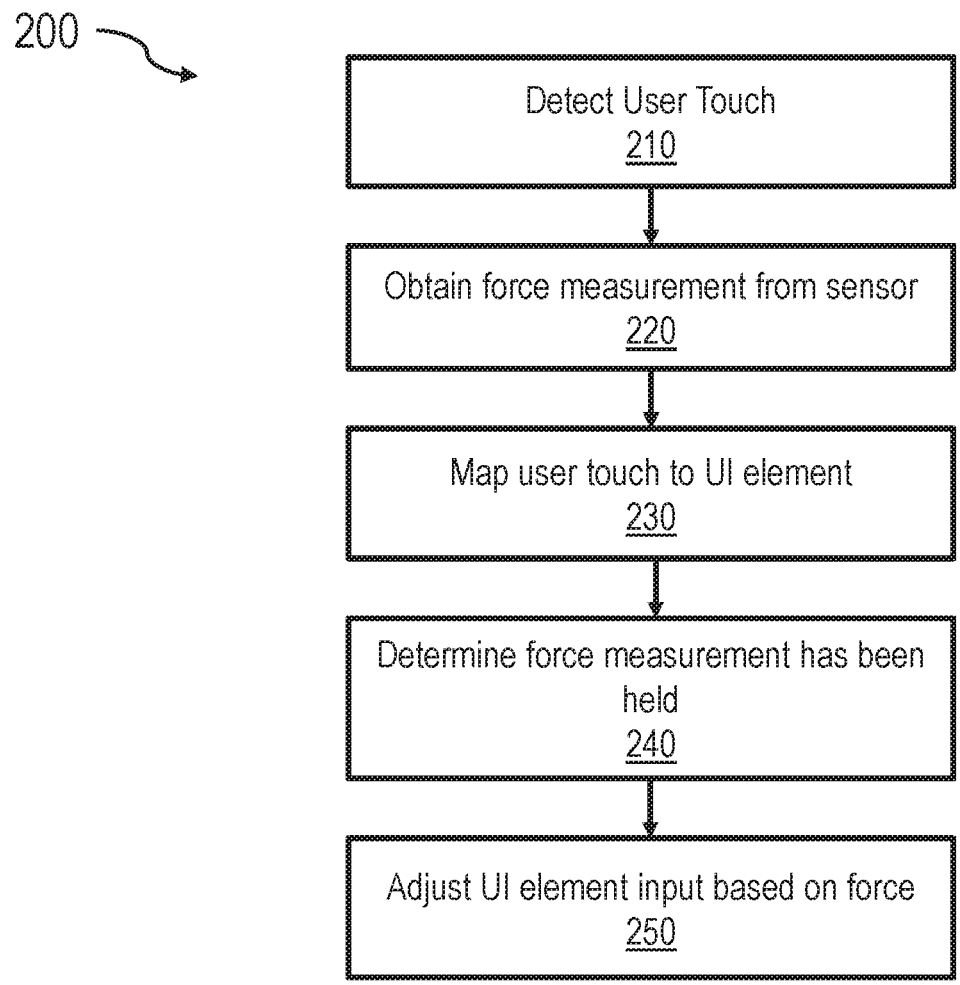
FIG. 2 illustrates a process for a 3D touch UI, according to an embodiment of the present invention.

FIG. 2 illustrates a process 200 for a 3D touch UI, according to an embodiment of the present invention. In step 210, a touch is detected by the mobile device. In step 220, a force measurement is obtained. In step 230, the user touch is mapped to a UI element and the force measurement changes the UI element displayed value. The user interface element may be activated based on the user touch. In step 240, the system determines that the force measurement has been held. In step 250, the UI element's value is adjusted based on the force measurement.

The implementation of the number picker takes advantage of a touch event thrown by the operating system to the application view controller for the picker when a user touch is detected. The user touch may be mapped to the particular UI element. The picker controller is able to access the following information through touch events.

1. The location on the screen where the touch event occurred. The controller handles events only occurred within the graphical area of the picker.

2. The maximum allowed force as it may vary between types of hardware, although fixed for a specific hardware (predetermined by the system, not user-specific)

3. The force value of the current touch event.

4. The normal force value for an average touch with no intention to provide force (predetermined by the system, not user-specific). In iOS, for instance, the information for location, maximum and force are all part of the event object thrown by the iOS to the view controllers.

The range of numbers that can be picked by the picker must be relatively narrow. Such a narrow range can be mapped into the range between normal touch force value and maximum available force value. The number of elements within the numbers range can then determine the force value ranges for each number.

The range of force value for each picker element can be calculated by using the following calculation.

Define MAX as the maximum possible force value and it is a constant provided by the operation system. For instance, this value on iPhone 6S is 6.66666667.

Define NORMAL as the normal force of touching the screen without providing a force and it is a constant provided by the operation system. For instance, this value on iPhone 6S is 1.0.

Define NUM as the number of picker elements.

Calculate the minimum range value of the n-th picker element to be R1=NORMAL+(MAX−NORMAL)*(n−1)/NUM Calculate the maximum range value of the n-th picker element to be R2=NORMAL+(MAX−NORMAL)*n/NUM The range for the n-th picker element will therefore be any force value greater than or equal to R1 and less than R2.

For instance, in the iPhone 6S the maximum available force value is 6.66666667. The normal touch force value is 1.0.

If the numbers picker needs to allow the user to pick an integer value between 1 and 5 (i.e. 1, 2, 3, 4 or 5) then the force quantity values can be binned as binned force quantities. The force values ranges for the binning will be as follows.

Value of 1 will match a force value greater than or equal to 1 and less than 2.133.

Value of 2 will match a force value greater than or equal to 2.133 and less than 3.266.

Value of 3 will match a force value greater than or equal to 3.266 and less than 4.4.

Value of 4 will match a force value greater than or equal to 4.4 and less than 5.533.

Value of 5 will match a force value greater than or equal to 5.533.

Although the change in force sensitivity defines the value picked by the force picker, actually picking a value is a result of applying the same level of force for some period of time, i.e. a consistent hold. Therefore a time counter will begin counting the amount of time passed since entering one of the ranges above. If the timer will hit a predefined period of time (e.g., 1 second) the currently matching value will be picked and the parent of the UI element will be notified about the picked value (i.e., 1 to 5 in the example above). The UI element may be modified based on the value. The predefined period of time can range from any values, but will typically be between 0.5 and 2 seconds.

While this description mainly discusses the case of a number picker, this mechanism can also be applied to other types of pickers such as sliders. A similar process may be used to control a webpage. The force measurement may be applied to the user interface element to scroll the page based on that force measurement. For example, a higher force measurement may indicate to scroll further or faster.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An apparatus for interfacing with a computer device comprising:
   a display comprising a force sensor;
   a force sensor controller configured to determine a force input based on a touch input to the display; and
   a processor coupled to the force sensor controller and configured to:
      receive the force input,
      determine a user interface element associated with the location of the force input, the user interface element adapted to pick a value from among a plurality of values,
      determine that a consistent level of force has been applied and has remained within one of more than two ranges of force value for a period of time between 0.5 seconds and 2 seconds, and
      pick a value based on the one range of force value within which the consistent level of force has been applied and has remained for the period of time;
   wherein each value to be picked corresponds to one of the more than two ranges of force value, a minimum range value for each value to be picked is determined according to R1=NORMAL+(MAX−NORMAL)*(n−1)/NUM, and a maximum range value for each value to be picked is determined according to R2=NORMAL+(MAX−NORMAL)*n/NUM, wherein R1 is the minimum range value, R2 is the maximum range value, NORMAL is a normal force of a touch without providing a force, MAX is a maximum possible force value of a touch, NUM is a number of the values to be picked, and n is an n-th value to be picked.

2. The apparatus of claim 1, wherein the processor is further configured to modify the user interface element based on the force input by applying a numerical quantity to an input field of the user interface element.

3. The apparatus of claim 2, wherein the numerical quantity comprises a binned quantity.

4. The apparatus of claim 1, wherein the user interface element comprises a picker.

5. The apparatus of claim 1, wherein the user interface element comprises a scroll input.

6. The apparatus of claim 1, wherein determining a consistent level of force has been applied comprises converting the force input into a binned force quantity and determining that the binned force quantity has not changed over a period of time.

7. An electronic device comprising:
   a display;
   at least one sensor to detect a user interaction event with the display; and
   a processing system to interpret data from the sensor and to display a user interface element on the display,
      wherein, the sensor receives a touch input from a user and generates a digitized force value and a display touch location, and wherein the processor receives the digitized force value and display touch location from the sensor, determines if the user interface element has been activated based on the display touch location, and if activated, determines that a consistent digitized force value has been applied and has remained within one of more than two ranges of force value for a period of time between 0.5 seconds and 2 seconds, and picks a value based on the consistent digitized force value has been applied and has remained for the period of time;
   wherein each value to be picked corresponds to one of the more than two ranges of force value, a minimum range value for each value to be picked is determined according to R1=NORMAL+(MAX−NORMAL)*(n−1)/NUM, and a maximum range value for each value to be picked is determined according to R2=NORMAL+(MAX−NORMAL)*n/NUM, wherein R1 is the minimum range value, R2 is the maximum range value, NORMAL is a normal force of a touch without providing a force, MAX is a maximum possible force value of a touch, NUM is a number of the values to be picked, and n is an n-th value to be picked.

8. The electronic device of claim 7, wherein the data input to the user interface element comprises a numerical quantity.

9. The electronic device of claim 8, wherein the numerical quantity comprises a binned quantity.

10. The electronic device of claim 7, wherein the user interface element comprises a picker.

11. The electronic device of claim 7, wherein the user interface element comprises a scroll input.

12. The electronic device of claim 7 wherein determining if the consistent digitized force value has occurred comprises converting the digitized force value into a binned force quantity and determining that the binned force quantity has not changed over a period of time.

13. A method for modifying computer device user interfaces comprising:
receiving, from a display with an integrated force sensor, a touch input;
determining, by a controller operatively coupled to the display, a display location and a force measurement based on the touch input;
mapping, by a processor coupled to the controller, the display location to a user interface element, the user interface element adapted to pick a value from among a plurality of values,
determining that a consistent level of force has been applied and has remained within one of more than two ranges of force value for a period of time between 0.5 seconds and 2 seconds, and
picking a value based on the consistent level of force has been applied and has remained for the period of time;
wherein each value to be picked corresponds to one of the more than two ranges of force value, a minimum range value for each value to be picked is determined according to R1=NORMAL+(MAX−NORMAL)*(n−1)/NUM, and a maximum range value for each value to be picked is determined according to R2=NORMAL+(MAX−NORMAL)*n/NUM, wherein R1 is the minimum range value, R2 is the maximum range value, NORMAL is a normal force of a touch without providing a force, MAX is a maximum possible force value of a touch, NUM is a number of the values to be picked, and n is an n-th value to be picked.

14. The method of claim 13, wherein applying the force measurement to the user interface element comprises inputting a quantitative value to an input field of the user interface element.

15. The method of claim 14, wherein the user interface element comprises a picker.

16. The method of claim 13, wherein the user interface element comprises a scroll input.

17. The method of claim 16, wherein applying the force measurement to the user interface element comprises scrolling the page based on the force measurement.

18. The method of claim 13, wherein determining a consistent level of force has been applied comprises converting the force measurement into a binned force quantity and determining that the binned force quantity has not changed over a period of time.

* * * * *